US 7,098,401 B1

(12) United States Patent
Herald et al.

(10) Patent No.: US 7,098,401 B1
(45) Date of Patent: Aug. 29, 2006

(54) GROMMET WITH REDUCED INSERTION FORCE

(75) Inventors: John Michael Herald, Ypsilanti, MI (US); Takeshi Takahashi, Novi, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/212,751

(22) Filed: Aug. 29, 2005

(51) Int. Cl.
 *H02G 3/08* (2006.01)
(52) U.S. Cl. .............................. 174/65 G; 174/65 SS; 174/152 G; 174/153 G; 16/2.1; 248/56
(58) Field of Classification Search ............. 174/65 G, 174/153 G, 65 SS, 152 G; 16/2.1, 2.2; 248/56
See application file for complete search history.

(56) References Cited

U.S. PATENT DOCUMENTS

| | | | |
|---|---|---|---|
| 2,225,472 A * | 12/1940 | Franklin | ..................... 277/604 |
| 3,243,206 A | 3/1966 | Samer | |
| 6,058,562 A | 5/2000 | Satou et al. | |
| 6,240,597 B1 | 6/2001 | Mochizuki | |
| 6,685,195 B1 | 2/2004 | Uchida et al. | |

FOREIGN PATENT DOCUMENTS

JP          07-115286          5/1995

* cited by examiner

*Primary Examiner*—Dhiru R. Patel
(74) *Attorney, Agent, or Firm*—Daniel R. Edelbrock

(57) ABSTRACT

A grommet fits around a wire harness and seats within and passes through an opening in a vehicle panel. The grommet has an internal tube section for snugly receiving the harness. At a first end of the grommet, a flange section is sized to seal against one side of the opening. A groove immediately adjacent the flange section receives an edge of the opening. From a side of the groove opposite the flange section, a tapered section converges to the tube section at a second end of the grommet. An engagement area of the tapered section immediately adjacent the groove is wider than a depth of the groove, so the engagement area rubs against the edge of the opening as the second end of the grommet and the tapered section are pulled through the opening. Multiple circumferential rows of depressions are provided around the tapered section within the boundaries of the engagement area. The depressions are circular in shape at an outer surface of the engagement area and bowl-shaped extending into the tapered section. The rows are offset so the depressions do not align along a longitudinal axis of the grommet. The depressions reduce frictional contact between the engagement area and the edge of the panel opening, and provide holding reservoirs for lubricant if used.

11 Claims, 4 Drawing Sheets

GROMMET WITH REDUCED INSERTION FORCE

BACKGROUND OF THE INVENTION

1. Field of the Invention

This invention relates in general to grommets for vehicle wire harnesses and more specifically to a grommet having an engagement surface feature for reducing the force needed to mount the grommet in a vehicle panel opening.

2. Discussion of Related Art

Various methods have been used to reduce the force required to mount a grommet in the opening of a vehicle panel or bulkhead through which a wire harness is routed. The vehicle panel is typically made of sheet metal. In some instances lubricant has been applied to the surface of the grommet that would contact an edge of the opening when the grommet is forced to a seated position. As might be expected, the lubricant spreads over the rest of the grommet, and can get on an assembler's hands and other parts of the vehicle.

An example of a prior art solution that makes structural changes to the grommet contact surface is illustrated in FIG. 1. A grommet 10 has a tubular section 12 that receives and fits around a wire harness. A tapered section 14 substantially surrounds the tubular section 12 and widens to a flange section 16. A groove 18 separates the flange section 16 from the tapered section 14. The groove 18 is sized to receive the edge of the opening through the panel. The flange section 16 seals against a wet side of the panel, and the tapered section 14 presses against a dry side of the panel. The wet side could, for example, be an engine compartment, and the dry side could be a passenger compartment. To mount the grommet 10, the tapered section 14 has to be pulled through the opening until the edge of the opening is received in the groove 18. To provide a tight fit and seal, an outer surface 20 of the tapered section adjacent the groove 18 must be wider than the opening. The grommet 10 uses circumferential ribs 22 around the tapered section 14 at the location of this outer surface 20. The circumferential ribs 22 are meant to provide more flexibility to this outer surface. However, these ribs 22 can catch on the sheet metal of the panel and make it difficult to know when the grommet 10 is seated properly.

Another solution is disclosed in Japanese Patent Application Document 07-115286, published May 2, 1995. An inclined grommet wall is manufactured with a number of projections to provide a point contact with the hole part of an automotive panel and reduce an abrasion coefficient. The projections increase the material needed to produce the grommet, and like the illustrated prior art described above, can catch on a perimeter of the hole.

In U.S. Pat. No. 6,058,562, spaced linear convex surfaces on a tapered surface of a grommet extend longitudinally along the grommet from a wiring harness holding area to an engagement area for gripping the opening in a vehicle panel. The convex surfaces slide along an edge of the opening and inhibit deformation of the grommet by thickening the tapered surface. This type of grommet would seemingly require more material, increasing the grommet cost, and if lubricant is applied the convex surfaces would not limit spreading of the lubricant.

SUMMARY OF THE INVENTION

Accordingly, it is an object of this invention to provide a grommet that reduces the insertion force required to properly position and seat the grommet.

Another object of the invention is to reduce the amount of material needed to manufacture the grommet.

A further object of the invention is to additionally use the insertion force reducing feature as a holding spot for lubricant.

In carrying out this invention in the illustrative embodiment thereof, dimples or depressions are formed in the surface of the grommet that contacts the sheet metal of a vehicle panel opening as the grommet is pulled to a seated position. The depressions are set to a minimal depth to ensure that they do not catch on the sheet metal. They are placed in rows, with the depressions of each row offset relative to the depressions in adjacent rows, until the desired width of a contact surface band is reached. The depressions enable the grommet to be inserted at a lower insertion force and remove the uncertainty as to whether the grommet is correctly seated or positioned because, again, the depressions cannot catch on an edge of the opening. The depressions reduce the overall material needed to make the grommet because material is subtracted from the thickness of the grommet in the vicinity of the contact surface. The depressions create a holding spot for a lubricant applied on the grommet surface if needed.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
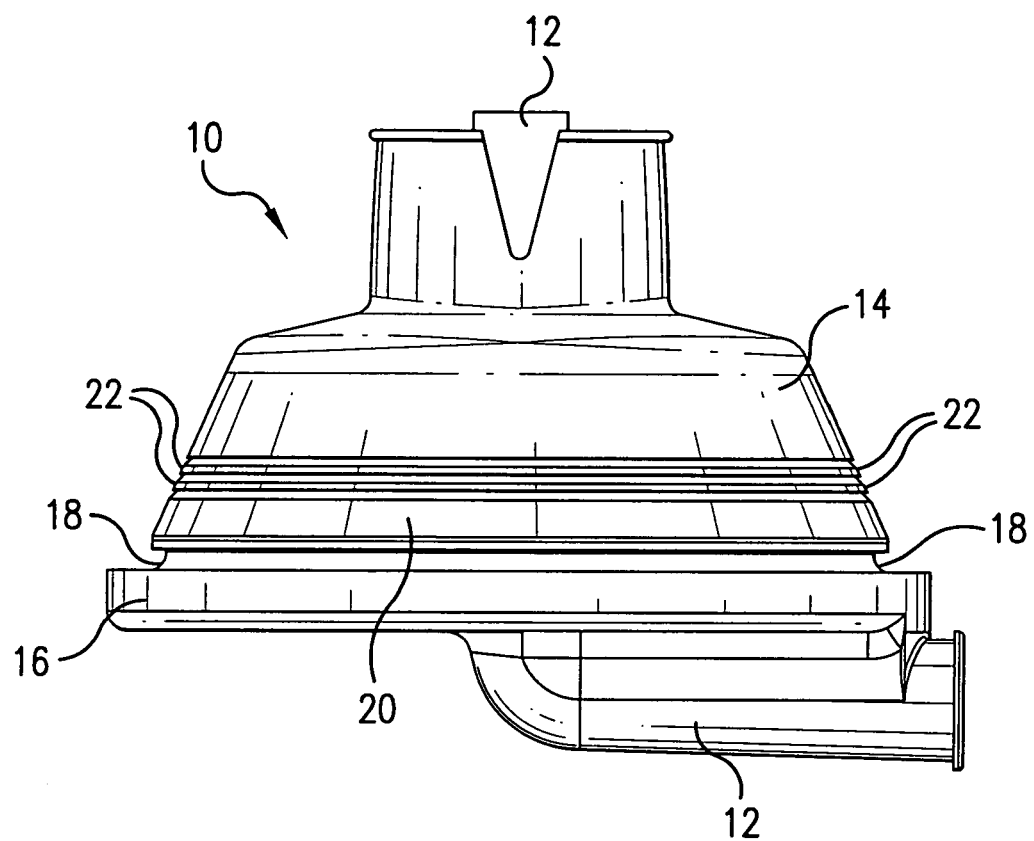
FIG. 1 is a side view of a prior art grommet with circumferential ribs adjacent a mounting section.
Figure 2:
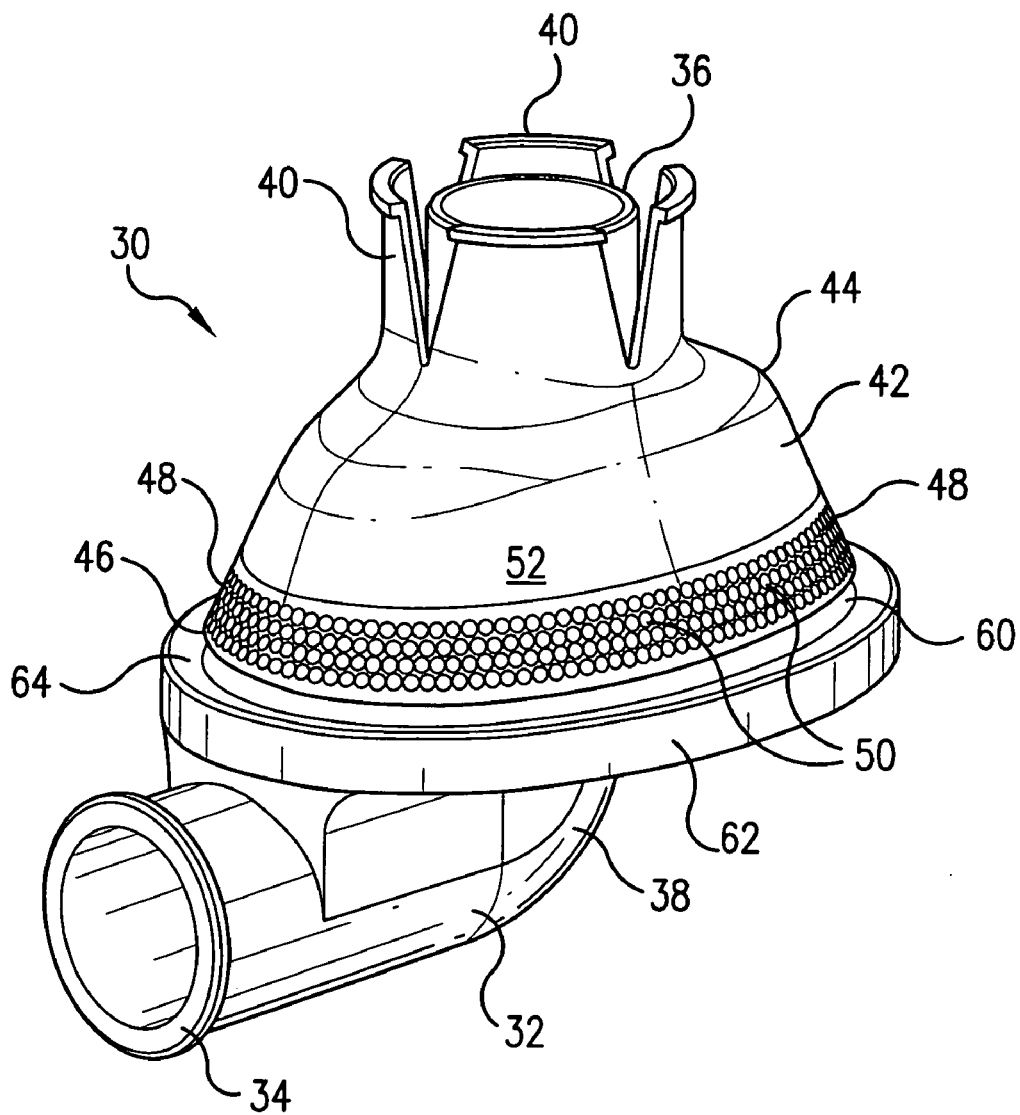
FIG. 2 is a perspective view of a grommet having an insertion force reducing feature according to the present invention.
Figure 3:
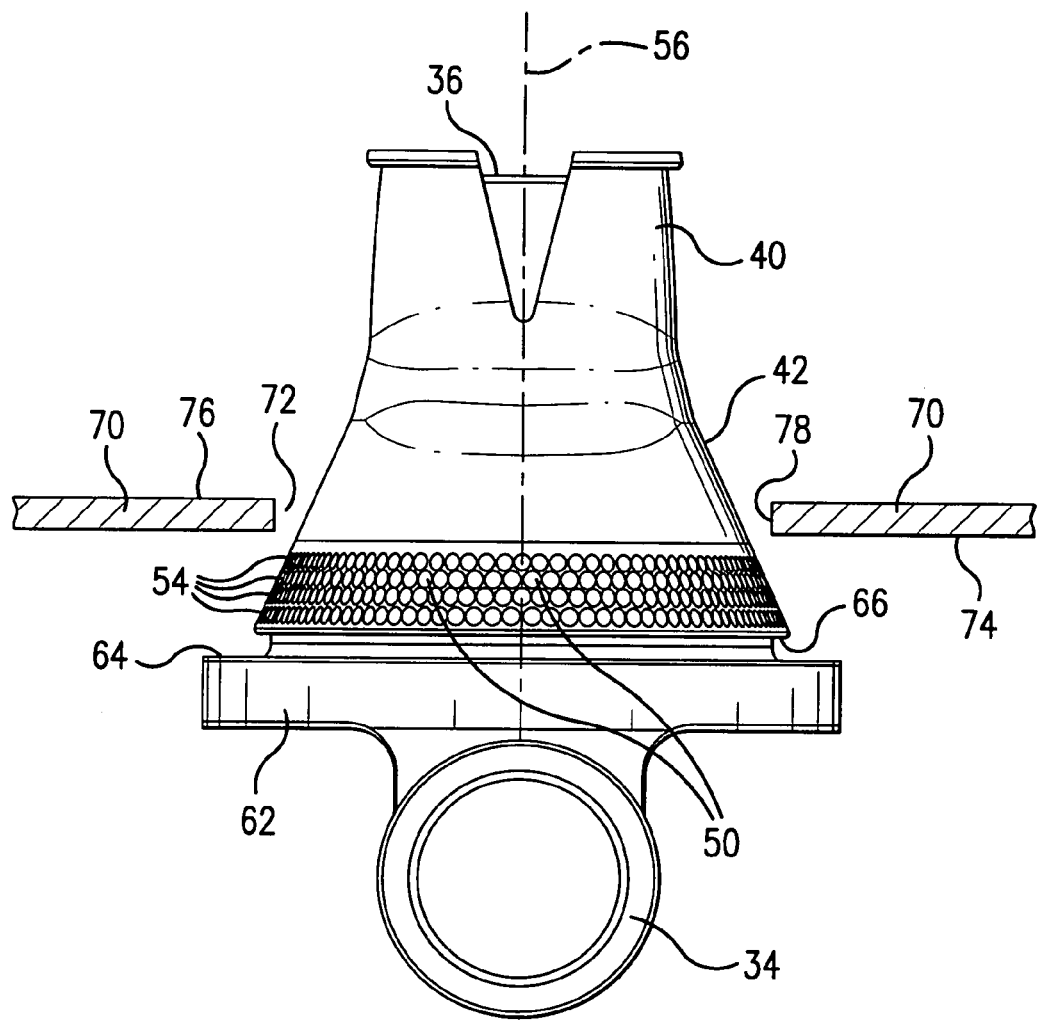
FIG. 3 is a side view of the grommet of FIG. 2.
Figure 4:
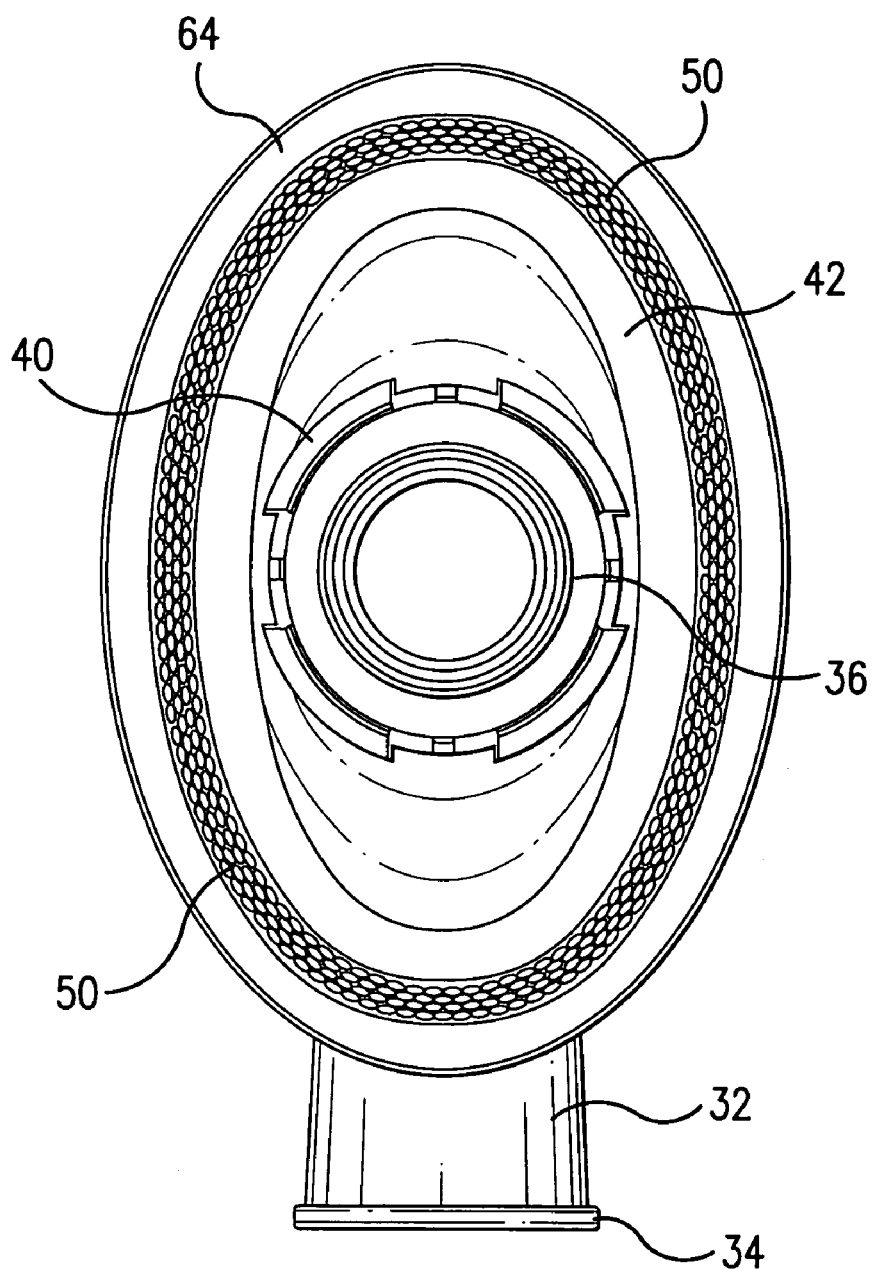
FIG. 4 is a top-end view of the grommet of FIGS. 2 and 3.

Referring now to FIGS. 2–4, a grommet 30 according to the present invention is illustrated. The grommet may be molded in one-piece from, for example, an Ethylene Propylene Diene Monomer (EPDM) rubber, or from a similar, relatively soft and pliable material. The grommet has an inner, tube or tube-like section 32 for fitting around a wire harness. The tube section 32 makes a right angle turn from a first end 34 to a second end 36 of the tube section at an elbow 38. The first end of the tube section would be on a wet side of a vehicle bulkhead or panel 70, such as in a vehicle engine compartment or the exterior surface of a hinge side of a door. The grommet is forced through an aperture or opening 72 in the panel 70 from a wet side 74 to a dry side 76 of the panel 70. The dry side could be, correspondingly, the interior of a passenger compartment or the interior of a door. Alternatively, the tube section could be straight or formed in a different angle. The tube section is sized to snugly fit around the harness, which is typically a bundle of wires wrapped in an outer sheath. Flaps or provisions 40 are formed around the second end 36 of the tube section 32.

Tape wrapped around the provisions 40, the second end 36 of the tube section, and the wire harness secures the grommet 30 in a particular location on the harness and helps waterproof the wire harness path.

A generally conical or tapered body portion or section 42 of the grommet diverges from the second end 36 of the tube section 32. The tapered section 42 has a narrow end 44 adjacent the second end 36 of the tube section and a wider, opposite end 46. The wider end 46 includes a nearby segment or band of area 48 that is larger in size than the aperture or opening 72 in the vehicle bulkhead or panel 70. Therefore, this area 48 engages or contacts a perimeter or edge 78 of the opening 72 as the grommet 30 is pulled through the opening from the second end 36 of the tube section 32.

The engagement band or contact area 48 on the tapered section 42 is molded with recesses in the form of dimples, indentations, or semi-spherical depressions 50 in an outer surface 52 of the tapered section. In other words, the depressions 50 are bowl-shaped extending into the thickness of the tapered section, but flush with the outer surface 52. They do not protrude from the outer surface 52, providing only a circular shape profile devoid of grommet material. The depressions are arranged in immediately adjacent, circumferential rows 54 extending around the tapered section 42 within the boundaries of the band 48. Four rows 54 of depressions are depicted, though there may be more or less as required by the size of the engagement band 48 and the selected size of the depressions 50. The depressions of each row are offset relative to depressions in adjacent rows so the depressions are not aligned along a longitudinal axis 56 of the grommet. The depressions could alternatively be cylindrical in depth rather than bowl-shaped, or in some other shape as long as the depressions do not provide raised points of contact for the edge of the panel opening. As illustrated, the depressions subtract surface from the contact area 48.

The width of the tapered section 42 decreases or drops off to form a channel or groove 60 between the extreme wide end 46 of the tapered section 42 and a holding and sealing portion or flange section 62. The groove 60 is sized to receive and tightly fit around the edge of the panel opening. The edge of the panel opening is received in the groove 60 after the wide end 46 of the tapered section 42 is pulled through the opening. A seal face 64 of the flange section 62 would then press against the wet side of the panel. The wider end 46 of the tapered section 42 where it drops off to form a side of the groove provides an opposing face 66 to seal against the dry side of the panel.

In the molding process, the depressions 50 reduce the amount of material needed because they take material away from the thickness of the tapered section 42. The depressions do not contact the edge of the panel opening, so abrasion or friction between the tapered section and the edge of the opening is drastically reduced. If the grommet environment requires even more reduction in insertion force, lubricant can be applied in the band of area 48 bounding the depressions. The depressions 50 would act as reservoirs to receive and hold the lubricant within this area 48, diminishing the possibility of lubricant spreading to and fouling other places in the vehicle. Having the depressions of each row 54 relatively offset would also help reduce the free flow of lubricant as well as help further reduce frictional contact with the edge of the opening, since there would be no straight areas of depressions and contact points relative to the longitudinal axis 56 of the grommet.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A grommet for fitting within and sealing an opening in a panel, the panel having two sides and the opening having an edge, the grommet comprising:
    a seal face for sealing against one side of the panel;
    a groove for receiving the edge of the opening to seat the grommet in the opening;
    a body portion extending from the groove, the body portion having a segment wider than the groove such that the segment must be forced through the opening to seat the grommet; and
    dimples in the segment for reducing frictional contact of the segment with the edge of the opening as the body portion is forced through the opening.

2. The grommet of claim 1 wherein the segment is next to the groove.

3. The grommet of claim 1 wherein the dimples have a circular shape at an outside surface of the body portion.

4. The grommet of claim 3 wherein the dimples are formed as semi-spherical depressions extending into a thickness of the body portion.

5. The grommet of claim 1 wherein the dimples are arranged in at least one circumferential row around the body portion.

6. The grommet of claim 5 wherein there are multiple rows of dimples.

7. The grommet of 6 wherein the rows are immediately adjacent to each other.

8. The grommet of claim 6 wherein the dimples in each row are offset relative to the dimples in other rows such that the dimples are not aligned along a longitudinal axis of the grommet.

9. A grommet for fitting within and through an aperture in a panel, the aperture having a peripheral edge, the grommet comprising:
    a tube section for fitting around a member inserted through the grommet;
    a tapered section converging to the tube section and having a first end joined to the tube section and a second, opposite end;
    a flange section separated from the second end of the tapered section by a groove, the flange section being wider than the second end of the tapered section such that the groove receives the peripheral edge of the aperture and the flange section presses against the panel after the tapered section is forced through the aperture; and
    a contact area on the tapered section adjacent the second end for sliding against and through the peripheral edge of the aperture as the tapered section is forced through the panel, the contact area having a flat outer surface with a plurality of closely spaced, semi-spherical depressions extending circumferentially around the tapered section.

10. The grommet of claim 9 wherein the depressions are in circumferential rows.

11. The grommet of claim 10 wherein the depressions in each row are offset relative to depressions in other rows, whereby the depressions are not aligned along a longitudinal axis of the grommet.

* * * * *